United States Patent
Kelly et al.

(10) Patent No.: US 10,227,856 B2
(45) Date of Patent: *Mar. 12, 2019

(54) FRACTURING FLUID COMPOSITION AND METHOD UTILIZING SAME

(71) Applicants: Richard M. Kelly, East Amherst, NY (US); William J. Scharmach, Grand Island, NY (US); Walter L. Renz, Brookfield, CT (US)

(72) Inventors: Richard M. Kelly, East Amherst, NY (US); William J. Scharmach, Grand Island, NY (US); Walter L. Renz, Brookfield, CT (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/385,215

(22) Filed: Dec. 20, 2016

(65) Prior Publication Data

US 2017/0101858 A1 Apr. 13, 2017

Related U.S. Application Data

(62) Division of application No. 14/136,767, filed on Dec. 20, 2013, now Pat. No. 9,580,641.

(51) Int. Cl.
| | | |
|---|---|---|
| *C09K 8/70* | (2006.01) | |
| *E21B 43/26* | (2006.01) | |
| *C09K 8/68* | (2006.01) | |
| *C09K 8/62* | (2006.01) | |
| *C09K 8/92* | (2006.01) | |
| *C01B 32/50* | (2017.01) | |
| *C08L 83/04* | (2006.01) | |
| *E21B 43/16* | (2006.01) | |

(52) U.S. Cl.
CPC ............ *E21B 43/26* (2013.01); *C01B 32/50* (2017.08); *C09K 8/62* (2013.01); *C09K 8/68* (2013.01); *C09K 8/70* (2013.01); *C09K 8/92* (2013.01); *C08L 83/04* (2013.01); *C09K 2208/28* (2013.01); *E21B 43/164* (2013.01)

(58) Field of Classification Search
CPC ........ C09K 8/68; C09K 2208/30; C09K 8/80; C09K 8/74; C09K 8/602; C09K 8/685; C09K 3/00; C09K 8/12; C09K 8/70; C09K 8/805; C09K 2208/26; C09K 8/524; C09K 8/584; C09K 8/588; C09K 2208/18; C09K 8/035; C09K 8/508; C09K 8/62; C09K 8/54; C09K 8/665; C09K 8/88; C09K 2208/12; C09K 2208/28; C09K 8/40; C09K 8/506; C09K 8/58; C09K 2208/08; C09K 2208/10; C09K 8/03; C09K 8/06; C09K 8/08; C09K 8/32; C09K 8/50; C09K 8/536; C09K 8/575; C09K 8/601; C09K 8/604; C09K 8/706; C09K 8/76; C09K 8/882; C09K 17/14; C09K 17/40; C09K 2208/00; C09K 2208/32; C09K 3/22; C09K 8/032; C09K 8/22; C09K 8/38; C09K 8/52; C09K 8/5751; C09K 8/66; C09K 8/72; C09K 8/86; C09K 8/887; C09K 8/94; C09K 2208/20; C09K 2208/34; C09K 3/32; C09K 8/04; C09K 8/18; C09K 8/502; C09K 8/5086; C09K 8/512; C09K 8/514; C09K 8/516; C09K 8/532; C09K 8/64; C09K 8/703; C09K 8/725; C09K 8/845; C09K 8/885; C09K 8/90; C09K 8/92; E21B 43/025; E21B 43/26; E21B 33/138; E21B 43/16; E21B 37/06; E21B 43/267; E21B 21/00; E21B 21/003; E21B 37/00; E21B 43/006; E21B 43/04; E21B 43/082; E21B 43/086; E21B 43/164

See application file for complete search history.

(56) References Cited

U.S. PATENT DOCUMENTS

| | | | |
|---|---|---|---|
| 3,193,014 A * | 7/1965 | Hill | E21B 43/26 166/177.5 |
| 4,573,488 A | 3/1986 | Carville et al. | |
| 4,701,270 A * | 10/1987 | Bullen | C09K 8/62 166/308.2 |
| 4,913,235 A * | 4/1990 | Harris | C09K 8/594 166/268 |
| 5,045,220 A | 9/1991 | Harris et al. | |
| 6,013,682 A | 1/2000 | Dalle et al. | |
| 7,392,844 B2 | 7/2008 | Berry et al. | |
| 7,726,404 B2 | 6/2010 | Gupta et al. | |

OTHER PUBLICATIONS

Liaw et al., "Effects of Molecular Characteristics of Polymers on Drag Reduction", AIChE Journal, vol. 17, No. 2, (Mar. 1971), pp. 391-397.
Huang et al., "Enhancement of the Viscosity of Carbon Dioxide Using Styrene/Fluoroacrylate Copolymers", Macromolecules (2000) 33, pp. 5437-5442.

* cited by examiner

*Primary Examiner* — Kumar R Bhushan
(74) *Attorney, Agent, or Firm* — Iurie A. Schwartz

(57) ABSTRACT

The present disclosure is directed to a composition and method of fracturing a formation penetrated by a well-bore. The composition and method comprises providing a fracturing fluid that is liquefied carbon dioxide ($LCO_2$) with at least one friction reducing polymer that is a polysiloxane dissolved in the $LCO_2$ at a concentration of about 0.001 to 1.0 weight percent, and a first at least one co-solvent, and optionally a second at least one co-solvent that has a closed cup flash point greater than the first at least one co-solvent, in order to enable dissolution of the polymer in order to effect friction reduction.

7 Claims, 2 Drawing Sheets

Commercial Field Application

Experimental Apparatus Used to Determine Friction Reduction

FRACTURING FLUID COMPOSITION AND METHOD UTILIZING SAME

RELATED APPLICATIONS

This divisional application claims the benefit of allowed U.S. patent application Ser. No. 14/136,767, filed on Dec. 20, 2013, which is incorporated herein by reference.

FIELD OF THE INVENTION

The present disclosure relates to compositions and methods for fracturing a formation with a fluid comprising liquid carbon dioxide, a friction reducing polymer that is a polysiloxane and at least one co-solvent.

BACKGROUND AND RELATED ART

Hydraulic fracturing is a common stimulation technique used to enhance production of oil and gas from hydrocarbon containing reservoirs. In a typical hydraulic fracturing operation, fracturing fluid is pumped at high pressures and high rates through a wellbore penetrating a subterranean formation to initiate and propagate hydraulic fractures in the formation. Subsequent steps typically include adding particulate matter known as proppant to the fracturing fluid (e.g., graded sand, ceramic particles, bauxite, or resin coated sand) which is carried by the fracturing fluid into the fractures. The proppant deposits into the fractures, forming a permeable "proppant pack". Once the fracture treatment is completed, the fracture closes onto the proppant pack allowing for maintenance of the fracture, thereby providing a pathway for hydrocarbons in the formation to flow more easily into the wellbore for recovery.

The use of carbon dioxide ($CO_2$) for production of oil and gas from hydrocarbon containing reservoirs is well known. Utilization of liquid carbon dioxide ($LCO_2$) for the fracture treatment of oil and gas formations has certain advantages in water-sensitive and low pressure formations. In particular, $LCO_2$ enables a significant reduction in the volume of water utilized, and promotes flow-back of water from the formation after fracture treatment. When exposed to aqueous based fluids, formations can trap water for long periods of time, which can result in reduced permeability to hydrocarbons and reduced productivity of the well. Additionally, some clays in the formation can swell in the presence of water or migrate through the formation resulting in closing off or blocking of porosity, again resulting in productivity impairment. Therefore, a reduction in the amount of water introduced into a well can result in decreased formation damage. Moreover, the availability of water for hydraulic fracturing may also be limited in certain geographies of interest for oil and gas production, thereby presenting an economic or regulatory barrier to practical recovery of these resources.

As mentioned above, the fracturing fluid is pumped at high pressures and rates. The pressure generated by the fracturing pumps is known as the "surface treating pressure" and is largely a function of the stress required to create the fracture in the formation, the fracturing fluid frictional pressure losses between the pumps and the formation, and the change in hydrostatic head. The surface treating pressure can be as high as 10,000 psig or more depending on the specific well requirements and pressure capability. The required fracture fluid flow rate is largely a function of the flow required to propagate the fracture and fluid leak-off into the formation. In addition, the flow rate must be sufficient to carry the proppant material (having a tendency to settle out at low flow rates), and is typically in the range 10 to 120 bpm (barrels per minute) depending on the needs of the particular well and fracture design. Well bores commonly can extend from a few thousand feet in shallow vertical wells, to ten or twenty thousand feet or more in long-reach horizontal wells. Common well-bore casing sizes are 4½ inch and 5½ inch, through which the fracturing fluid is pumped. Tubing can also be employed, having a common nominal diameters of 2⅜ inches or 2⅞ inches, inserted through the well casing to carry the fracture fluid. This is performed, for example, when the casing is not strong enough to hold the required fluid pressure.

As can be appreciated there are often scenarios where extremely high frictional pressure drops would be incurred due to high flow rates, small casing or tubing diameters, long well bores, or combinations of these factors. To counteract high pressure drops experienced in conventional fracturing fluids, friction reducers (also commonly referred to as drag reducers) are used. These friction reducers are usually high molecular weight water-soluble polymers, which are directly added and dissolved in the aqueous fracturing fluid, and have been shown to reduce frictional pressure losses by up to about 70%.

The use of "slickwater" fracturing fluids, which employ a friction reducer in a water carrier fluid is well known in the industry. A common friction reducer used in slickwater is a high molecular weight (typically in the range 5,000,000 to 20,000,000 g/mol) polyacrylamide normally supplied as an inverse or water-in-oil emulsion. Concentrations of friction reducers employed in slickwater typically range from about 0.25 gpt (gallons per thousand) to 2 gpt. A key consideration in the design of a friction reducer system is the need to quickly dissolve the friction reducer in the fracturing fluid thereby allowing the friction reducer to become effective as soon as possible, as it is usually only a matter of seconds from the time that the friction reducer is added to when the fracturing fluid first enters the well-bore.

Limited work has been published on the use of high molecular weight polymers as friction reducers for $CO_2$. U.S. Patent Application Publication No. 2012/0037371 A1 to Gupta, et al discloses the use of polychloroprenes, vinyl acetate polymers, polyalkylene oxides and polyalphaolefins as friction reducers in a non-aqueous carrier fluid, which may further include $CO_2$. U.S. Pat. No. 4,573,488 A to Canine et al discloses the use of a homopolymer or copolymer of butylene oxide for friction reduction in non-aqueous carrier fluids. Similarly, U.S. Pat. No. 5,045,220 discloses the use of a polysiloxane and co-solvent for the purposes of thickening $CO_2$, however, this patent states that the polymers used more usually have a molecular weight from 2,000 to 400,000 and that suitable polysiloxanes have a kinematic viscosity of 20,000 centi-Stokes (cSt) to 8,000,000 cSt at 77° F.

The present invention provides for the use of polysiloxanes with a weight average molecular weight of 500,000 g/mol or more and a kinematic viscosity greater than 10,000,000 cSt, at 77° F., in combination with one or more co-solvents, in order to reduce friction in $LCO_2$. It has been found that by employing the fracturing fluid composition of the present invention, one or more of the following objectives can be realized:

$CO_2$ based fracture treatment fluids with reduced frictional loss characteristics can be formed and the friction reducing agents will reduce the pumping equipment and power required to treat a formation and in other cases the friction reducing agents will enable a higher flow rate of fracturing fluid to be used to treat the formation;

additionally, the methods of the present disclosure may provide reduced damage to well formations via the use of non-aqueous fracturing fluids.

Other objects and aspect of the present invention will become apparent to one of ordinary skill in the art upon review of the specification, drawings and claims appended hereto.

SUMMARY OF THE INVENTION

In accordance with one aspect of the invention, a fracturing fluid composition is provided. The composition includes: (i) liquid carbon dioxide ($LCO_2$) in a quantity of at least 80 wt % of the fluid composition in combination with (ii) at least one friction-reducing polymer having a molecular weight greater than 500,000 g/mol and a kinematic viscosity greater than 10,000,000 cSt in a quantity of 0.001-1.0 wt % of the fluid composition, wherein said friction reducing polymer is soluble in said $LCO_2$, and (iii) at least one co-solvent in an amount of 0.1-19 wt % of the fluid composition.

In another aspect of the invention, system for fracturing a well utilizing a fracturing fluid composition is provided. The system includes:

providing a storage tank holding the liquid carbon dioxide at a pressure range of about 150 to 400 psig and a temperature of −40 to +20° F.;

providing a fracturing pump in fluid communication with the storage tank disposed downstream thereof, wherein the fracturing pump raises the pressure of the liquid carbon dioxide to a pressure in the range of 2,000 to 10,000 psig;

providing a well head in fluid communication with the fracturing pump to receive the fracturing fluid composition during a fracturing operation; and providing an injection point downstream of the fracturing pump for injecting at least one friction-reducing polymer having a molecular weight greater than 500,000 g/mol and a kinematic viscosity greater than 10,000,000 cSt in a quantity of 0.001-1.0 wt dissolved in at least a portion of one co-solvent in an amount of 0.1-19 wt % of the fluid composition.

DETAILED DESCRIPTION

Figure 1:
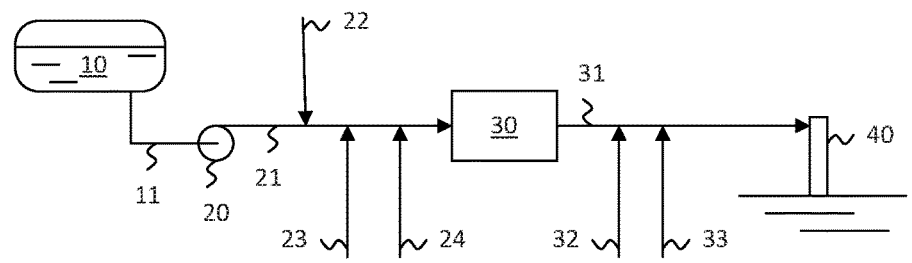
FIG. 1 is a schematic of an exemplary embodiment of the system utilized in the present invention.

The present invention involves the dissolution of relatively low concentrations (approximately 0.001 to 1.0 weight percent) of high molecular weight polymers into liquid carbon dioxide ($LCO_2$) to act as friction reducers in order to save pumping power at a given fracture fluid flow rate, or to enable use of a fracture fluid flow rate that would be otherwise impossible using only $LCO_2$ due to an excessively high pressure drop. Much work has been conducted investigating the solubility of long chain, high molecular weight polymers in high pressure $LCO_2$ and supercritical $CO_2$ in order to increase viscosity, primarily for improved utilization of the $CO_2$ in Enhanced Oil Recovery (EOR) processes. However, the general conclusion has been made that high molecular weight polymers are either insufficiently soluble, or lacking in their ability to effectively thicken the $CO_2$ when in solution.

Liquid $CO_2$ is non-polar compound and generally a poor solvent. Short chain, low molecular weight compounds tend to be more soluble in $LCO_2$ than long chain, high molecular weight compounds. Many light hydrocarbons, for example, alcohols, paraffins, and ketones are miscible with $LCO_2$, whereas many polymers are only sparingly soluble, or substantially insoluble. In some cases, low molecular weight compounds can be used as co-solvents for high molecular weight polymer in order to enable or increase the solubility of the polymer in the $LCO_2$.

The components of the present composition can be selected from among the following:

Friction Reducers

The friction reducers are polysiloxane polymers capable of reducing frictional pressure losses in a non-aqueous carrier fluid, and capable of dissolving in $LCO_2$ through the use of a co-solvent. Examples of suitable polysiloxane friction reducing polymers according to the present disclosure include those having a weight average molecular weight greater than approximately 500,000 g/mol, a kinematic viscosity greater than 10,000,000 cSt at 77° F., and those being terminated by hydroxyl, trimethylsiloxy, and vinyl groups.

The friction reducer polymer can be prepared by polymerization using any suitable techniques known in the art. In one embodiment, the resulting polymers can have weight average molecular weights of greater than 500,000 g/mol as determined by gel permeation chromatography (GPC) for example, and a kinematic viscosity greater than 10,000,000 cSt, measured at 77° F. Examples of suitable commercially available polysiloxanes include high molecular weight linear polysiloxanes manufactured or distributed by Dow Corning, Wacker, Shinetsu, Gelest, Clearco.

As mentioned above, the high molecular weight polysiloxanes range from viscous liquids to rubbery materials depending on their molecular weight. The polysiloxane friction reducing polymer can be in any suitable form that is capable of dissolution in a suitable co-solvent and $LCO_2$, such as a viscous liquid, a granulated form of the same, or a solution in a suitable co-solvent. Friction reducing polysiloxane polymer concentrations can range, for example, from about 0.001 to 1.0 weight percent based on the weight of the total fracturing fluid. Ratios and concentrations outside of these ranges can also be employed as needed depending on the fracturing needs of the individual well.

Co-Solvent

A first co-solvent used to aid dissolution of the friction reducing polysiloxane polymer in $LCO_2$ is one that is soluble in $LCO_2$ and also that is capable of dissolving the pure polysiloxane polymer. Examples of suitable co-solvents include condensate, diluent, toluene, liquefied petroleum gas, propane, butane, pentanes, hexanes, heptanes, naphthas, kerosene, acetone, tetrahydrofuran, silicone oils, linear or cyclic forms of the aforementioned compounds or mixtures thereof. Condensate is a term used to describe light hydrocarbons, such as ethane, propane, butane etc., separated from natural gas. Diluent is a term used to describe a mixture of light hydrocarbons added to bitumen and other high viscosity fluids to make them more flowable. Naphthas is a general term for a mixture of hydrocarbons usually having between five (5) and twelve (12) carbon atoms per molecule. Kerosene is a petroleum distillate comprising a mixture of hydrocarbons usually having between six (6) and sixteen (16) carbon atoms per molecule.

A second co-solvent can be employed to aid dissolution of the friction reducing polysiloxane polymer in $LCO_2$, and is one that is soluble in $LCO_2$, that tends to be a poor solvent for the friction reducing polysiloxane polymer, but that is found to aid dissolution of the polymer into the $LCO_2$ when separately added to the fracturing fluid composition, and that has a closed cup flash point greater than 140° F. Examples of suitable second co-solvents include methyl oleate, biodiesel, diethylene glycol dimethyl ether, tetraethylene glycol dimethyl ether, diethylene glycol butyl ether acetate and dipropylene glycol methyl ether acetate or mixtures thereof.

Co-solvent concentrations can range, for example, from about 0.1 to 19 weight percent based on the total weight of the fracturing fluid. Ratios and concentrations outside of these ranges can also be employed as required.

$LCO_2$

The $CO_2$ usable for fracturing a formation is usually in liquid form, usually having a pressure in the range 2,000 to 10,000 psig, and temperature below 88° F. It is possible that at some point after the high pressure fracture pumps, that the temperature of the $CO_2$ will rise above 88° F., and the pressure will be above 1056 psig causing the $CO_2$ to exist in a supercritical state. The $CO_2$ is intended to by dry/non-aqueous and containing 5 percent water by weight or less, based on the total weight of the carrier fluid. In some cases embodiments, the fracturing fluid can contain 1 percent by weight water or less, or substantially no water.

Surfactants

In addition to the ingredients discussed above, the fracturing fluid can optionally include a surfactant. Any suitable surfactant that is soluble in a $LCO_2$ fracturing fluid can be employed. In some embodiments, the fracturing fluids does not include surfactant agents.

Viscosity Modifying Agents

Another optional additive that may be employed for fracturing fluids includes a viscosity modifying agent. Any viscosity modifying agent suitable for adjusting the viscosity of $LCO_2$, such as fumed silica, can potentially be used. In some embodiments, the fracturing fluid does not include viscosity modifying agents.

Proppants

Proppants can be mixed with the fracturing fluids of the present application. Any suitable proppant can be employed. Proppants are generally well known for use in fracturing fluids. Examples of suitable proppant include graded sand, glass or ceramic beads or particles, bauxite grains, resin coated sand, walnut shell fragments, and combinations of the above.

Proppants are well known to be used in concentrations ranging from about 0.05 to about 14 pounds per gallon of fracturing fluid composition, but higher or lower concentrations can be used as desired for the particular fracture design.

One exemplary embodiment of the present invention is directed to a unique composition of a fracturing fluid for treating a formation. The fluid composition is formulated with the following components: liquid carbon dioxide ($LCO_2$) together with at least one friction reducing polymer that is a polysiloxane, and at least one co-solvent utilized to enable dissolution of the polysiloxane friction reducer in $LCO_2$, and enable its friction reducing function. The polysiloxane may be any member of the polysiloxane family that is soluble in $LCO_2$, usually through use of a co-solvent, and that is of sufficient molecular weight that it shows a propensity to significantly reduce frictional losses in flowing $LCO_2$. The polysiloxane is preferably polydimethylsiloxane (PDMS) that is either terminated with hydroxy, trimethylsiloxy, or vinyl groups for instance, depending on the manufacturer's synthesis method. The polysiloxane should have a weight average molecular weight greater than about 500,000 g/mol and kinematic viscosity greater than 10,000,000 cSt, measured at 77° F. The at least one co-solvent may be any solvent or mixture of solvents, that enhances or enables the dissolution of the polysiloxane in $LCO_2$, and is commonly an organic solvent or petroleum distillate. Such a co-solvent can be selected from among: condensate, diluent, toluene, liquefied petroleum gas, propane, butane, pentane, hexane, cyclohexane, heptane, naphthas, kerosene, acetone, tetrahydrofuran, linear or cyclic siloxanes or mixtures thereof, and should be capable of directly dissolving the polysiloxane therein, prior to addition to the $LCO_2$.

In another embodiment of the present invention a second co-solvent is employed, in partial substitution for the first co-solvent, which has a higher boiling point and in particular a higher flash point, so as to minimize the concentration and quantity (and, therefore, flammability risk) of the first co-solvent having a lower boiling point and flash point. Preferred second co-solvents are also those which promote good solvation of the polysiloxane in the fracturing fluid as evidenced by higher friction reduction results at lower concentrations, and have the following desirable properties: low cost, low human and environmental toxicity, ready biodegradability; are non-damaging to the well formation and compatible with downstream natural gas/oil transport, processing, and refining operations. Suitable second co-solvents are sometimes found to be poor solvents for the polysiloxane polymer by themselves but when used in combination with the $LCO_2$ and first co-solvent, are found to be good co-solvents for the polysiloxane in $LCO_2$.

The second co-solvent is selected from one of the following:

1) A fatty acid monoalkyl ester. These materials include saturated and unsaturated esters of between about 8 and about 24 carbon units per chain which are typically obtained from triglycerides of plant or animal origin by means of transesterification with $C_1$-$C_4$ monohydric alcohols. Examples include mixed and pure fatty acid esters such as isopropyl myristate, isopropyl laurate, methyl oleate, and fatty acid methyl esters derived from the methanolysis of soy, corn, canola, coconut and palm oils, beef tallow, yellow grease, used cooking oils and the like, which are commonly sold as biodiesel fuel. Preferred materials of this class are liquid esters having an advantageously low melting point and high flash point such as methyl oleate and soybean oil biodiesel.

2) An alkylene glycol derivative. Suitable materials are derivatives of linear diols containing from one to about four ethylene oxide and/or propylene oxide units, that may be independently terminated by either a $C_1$-$C_6$ alkyl or aryl ether or a $C_2$ to $C_4$ carboxylic acid ester. Materials included in this category have the general structure below:

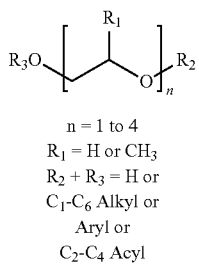

n = 1 to 4
R₁ = H or CH₃
R₂ + R₃ = H or
C₁-C₆ Alkyl or
Aryl or
C₂-C₄ Acyl

Examples of this class include unsubstituted glycols such as tetraethylene glycol; glycol monoethers such as propylene glycol phenyl ether (DOWANOL PPH); glycol diethers such as triethylene glycol dimethyl ether ("diglyme") and tetraethylene glycol dimethyl ether ("tetraglyme"); glycol mono-alkyl ether esters such as diethylene glycol butyl ether acetate (EASTMAN DB ACETATE) and dipropylene glycol methyl ether acetate (DOWANOL DPMA); and glycol diesters such as propylene glycol diacetate (DOWANOL PGDA). Preferred materials of this class will have at least one terminal ether or ester substitution. Examples of preferred materials are tetraethylene glycol dimethyl ether and diethylene glycol monobutyl ether acetate.

3) A $C_8$-$C_{18}$ aliphatic alcohol or the ester of these with a $C_2$-$C_4$ carboxylic acid. Examples of materials of this class include 2-ethylhexanol, lauryl alcohol, hexadecanol and 2-ethylhexyl acetate.

Polydimethylsiloxane is also commonly known as "PDMS", dimethylpolysiloxane, dimethyl silicone oils, and dimethicone. Polysiloxanes is a general term for compounds like polydimethylsiloxane that are based on a Si—O repeating unit backbone, and can be referred to as silicone oil, liquid silicone, silicone liquid, 100% silicones, can more generally be employed. In addition the polydimethylsiloxane, or more generally, the polysiloxane, may contain a minor quantity of a copolymer, and still be termed polydimethyl siloxane or polysiloxane. Polysiloxanes is a common term used in marketing and selling these compounds.

The concentration of the at least one friction reducer in the fracture fluid is preferably in a range of between 0.001 and 1.0 weight percent (10 to 10,000 wppm) in order to provide sufficient friction reduction in the $LCO_2$ fracturing operations. The concentration of the first co-solvent is preferably in the range of between 0.1 and 19 weight percent. If used, the concentration of the second co-solvent is also preferably in the range of between 0.1 and 19 weight percent, but in direct, partial substitution for the first co-solvent, such that the total amount of co-solvent is also preferably in the range 0.1 to 19 weight percent. The composition of the fracturing fluid often also includes a proppant.

Another aspect of the present disclosure is directed to the method or fracturing or treating a formation using the friction reducing agents. The method includes providing the friction reducing fluid as described above, formulated with the following components: $LCO_2$, at least one friction reducer that is a polysiloxane, a first co-solvent selected from the group of: condensate, diluent, toluene, liquefied petroleum gas, propane, butane, pentane, hexanes, cyclohexane, heptane, naphthas, kerosene, acetone, tetrahydrofuran, and linear or cyclic siloxanes, and optionally a second co-solvent selected from the groups of chemicals such as: fatty acid monoalkyl esters, such as methyl oleate and various types of biodiesel; alkylene glycol derivatives such as tetraethylene glycol dimethyl ether or diethylene glycol butyl ether acetate; $C_8$-$C_{18}$ aliphatic alcohols and esters of these. In order to maximize effectiveness, the co-solvents should be soluble in the $CO_2$ over the range of temperatures and pressures observed in the fracturing operation, and in turn, the friction reducing polysiloxane polymer should be soluble in the resultant $CO_2$ and co-solvent mixture. For example, the temperature of the $CO_2$ will normally be below ambient temperature immediately after the fracturing pumps, and in cases may warm to above its critical temperature of approximately 88° F. as it passes through the well-bore and into the formation, causing the $CO_2$ to be in its supercritical state. The pressure of the $CO_2$ will normally be in the range 2,000 to 10,000 psig. The $CO_2$, co-solvents and polysiloxane, should preferably form a single phase solution over these ranges of temperature and pressures.

The preferred polysiloxane polymers of the present invention are only made soluble in $LCO_2$, in sufficient concentration to be effective as friction reducers, through the use of a suitable co-solvent. Further, these polymers tend to be highly viscous liquids or rubber-like solids that are hard to flow. Therefore, it is preferred to dissolve the polysiloxane polymer into at least a portion of a first co-solvent before addition into the $LCO_2$ in order to make the polysiloxane more flowable (i.e. reduce its viscosity) and to provide improved mixing in the $LCO_2$ and promote a single phase solution of the polymer in the mixture. In practice it is found that a maximum of about 10 to 20 wt % of the polysiloxane in the first co-solvent can be obtained before this solution becomes viscous and hard to flow without heating. The solubility of the polysiloxane in the $LCO_2$, aided by co-solvent(s), increases with increasing $LCO_2$ pressure, and is it is preferred to add the polysiloxane dissolved in at least a portion of the co-solvent, into the $LCO_2$ on the high pressure side of the fracturing pumps, where pressures will normally be in the range 2,000 to 10,000 psig, instead of on the low pressure side of the fracturing pumps where pressures will normally be in the range 150 to 400 psig. Additionally, it is preferred to add the polysiloxane dissolved in at least a portion of the co-solvent(s) into a flowing stream of $LCO_2$, where the shear rate is such that the components are effectively dispersed in one another and able to become a single phase mixture in a relatively short amount of time. In particular, if the shear rate is insufficient, the co-solvent introduced with the polymer will dissolve more rapidly into the $LCO_2$ than the polymer, and the polymer can separate into large, discrete precipitates, that present a relatively low surface area to the co-solvent and $LCO_2$ phase and that will take an inordinately long amount of time to dissolve in order to become effective as a friction reducer.

In most cases, the polysiloxane polymer, made flowable through dissolution in the co-solvent is conveniently added to the flowing, high pressure $LCO_2$ by the use of a positive displacement metering pump.

Now turning to FIG. 1, an exemplary commercial embodiment of the system employed is depicted. The $LCO_2$, can be stored as a bulk refrigerated liquid in insulated storage tank(s) 10, at a pressure in the approximate range 150 to 400 psig, and with a temperature at or below its boiling point, and is typically in the range −40 to 20° F. depending on pressure. $LCO_2$ is fed to booster pump 20 via line 11, where its pressure is raised by about 50 psi before being fed to high pressure frac pump(s) 30 via line 21. Booster pump 20 ensures that the pressure of $LCO_2$ passing to high pressure frac pump(s) is sufficiently above its vapor pressure to mitigate cavitation or vapor lock in high pressure frac pump(s) 30. High pressure frac pump(s) 30 raise the pressure of the LCO$_2$ to value typically in the range 2,000 to 10,000 psig, depending on the needs of the particular fracture treatment. High pressure LCO$_2$ is then fed to well head 40 via line 31. When proppant is required, it is conveniently added to LCO$_2$ stream 21 via line 22.

In this embodiment, a friction reducing polymer, such as PDMS having a kinematic viscosity of greater than 120,000,000 cSt, is pre-dissolved in a first co-solvent, such as a naphtha, and added to LCO$_2$ stream 31 on the high pressure side of frac pumps 30, via line 33 by a suitable means such as a high pressure positive displacement metering pump. A second lower flammability co-solvent, such as methyl oleate, is added to LCO$_2$ stream 31 via line 32 at distance sufficiently upstream of line 33 so that the second co-solvent is well mixed and in the LCO$_2$ prior to addition of the friction reducing polymer and the first co-solvent. Then when the polymer and first co-solvent are added, there is sufficient first and second co-solvent present in the LCO$_2$ for the polymer to completely dissolve and become effective as a friction reducer.

Other embodiments are contemplated such as with the addition of the second co-solvent to the LCO$_2$ in storage tank(s) 10, giving the advantage of being pumped with the LCO$_2$ by booster pump 20. Second co-solvent may also be conveniently added to the LCO$_2$ via line 23 prior to the high pressure frac pumps, since it is usually also soluble in the LCO$_2$ at relatively low pressures. Additionally, friction reducing polymer pre-dissolved in the first co-solvent may be added to LCO$_2$ stream 21 on the low pressure side of fracture pump(s) 30 via line 24. The friction reducing polymer will not substantially dissolve in the LCO$_2$ at low pressure, but when injected here is will tend to precipitate out and be well dispersed in the LCO$_2$ under the high shear conditions, rapidly pass through frac pump(s) 30, whereupon the pressure will be raised sufficiently high to enable dissolution of the polymer and its effectiveness as a friction reducer. In yet another embodiment, the second co-solvent is not utilized and the friction reducing polymer is pre-dissolved the first co-solvent and added to the LCO$_2$ stream via lines 33 or 24. In a further embodiment, the friction reducing polymer is pre-dissolved in a portion of the first co-solvent and the remaining amount of the first co-solvent necessary to render the polymer soluble in the LCO$_2$, is added via LCO$_2$ tank(s) 10 or line 23. The present invention will be further described with respect to the following examples, which are not to be construed as limiting the invention, but rather to further illustrate the various embodiments.

EXAMPLES

In order to characterize the efficacy of polysiloxane polymers as friction reducers for LCO$_2$, samples of several different polysiloxane polymers (described in Table 1, below) were combined with various co-solvent(s) and LCO$_2$ to form a single phase solution.

TABLE 1

Polymers Tested

| Polymer Sample Number | Polymer | Molecular weight (g/mol) | Termination group | Kinematic viscosity (cSt) |
|---|---|---|---|---|
| 1 | PDMS | 204,000 | trimethylsiloxy | 300,000 |
| 2 | PDMS | 597,000 | trimethylsiloxy | 20,000,000 |

TABLE 1-continued

Polymers Tested

| Polymer Sample Number | Polymer | Molecular weight (g/mol) | Termination group | Kinematic viscosity (cSt) |
|---|---|---|---|---|
| 3 | PDMS | 750,000 | hydroxy | undetermined |
| 4 | PDMS | undetermined | vinyl | >120,000,000 |

PDMS polymer samples 1 and 2 were supplied by Clearco Products Co., Bensalem, Pa. PDMS polymer samples 3 and 4 were proprietary samples.

Each formed solution was flowed through a length of narrow diameter tubing at a room temperature of approximately 70° F., at varying rates, and the resultant pressure drops measured and compared to those observed with pure LCO$_2$. Lower pressure drops in the solutions indicated a reduction in frictional pressure loss. Experimental data was used to calculate Fanning friction factors, and the reduction in Fanning friction factor relative to pure LCO$_2$ was calculated and given as "Percent Friction Reduction". The purpose of the polysiloxane polymer is to reduce frictional pressure losses in LCO$_2$. This becomes apparent as a reduction in the pressure drop measured over the length of a conduit for a fixed flow rate of fluid. As is well known in the art, the propensity of a fluid for frictional pressure loss flowing in a given pipe is conveniently expressed as the Fanning friction factor as expressed in Equation 1, below, and is usually given relative to the flowing fluid's Reynolds number. Additionally, fiction reduction through use of an additive, is conveniently given by the reduction in the Fanning friction factor relative to that of the pure fluid, and herein termed "Percent Friction Reduction" and abbreviated to "FR %", as expressed in Equation 2.

$$f = \frac{\Delta P \cdot D}{2 \cdot \rho \cdot V^2 \cdot L}, \qquad \text{Equation 1}$$

where: f is the Fanning friction factor; $\Delta P$ is the frictional pressure drop; D is the pipe inside diameter; $\rho$ is the fluid density; V is the average fluid velocity; and L is the pipe length, all units being expressed in SI International System of Units, for consistency.

$$FR\ \% = 100 \times \frac{f_0 - f_1}{f_0}, \qquad \text{Equation 2}$$

where: $f_0$ is the Fanning friction factor of the pure, or starting fluid; $f_1$ is the Fanning friction factor of the same fluid with the addition of the friction reducer.

Example 1

Figure 2:
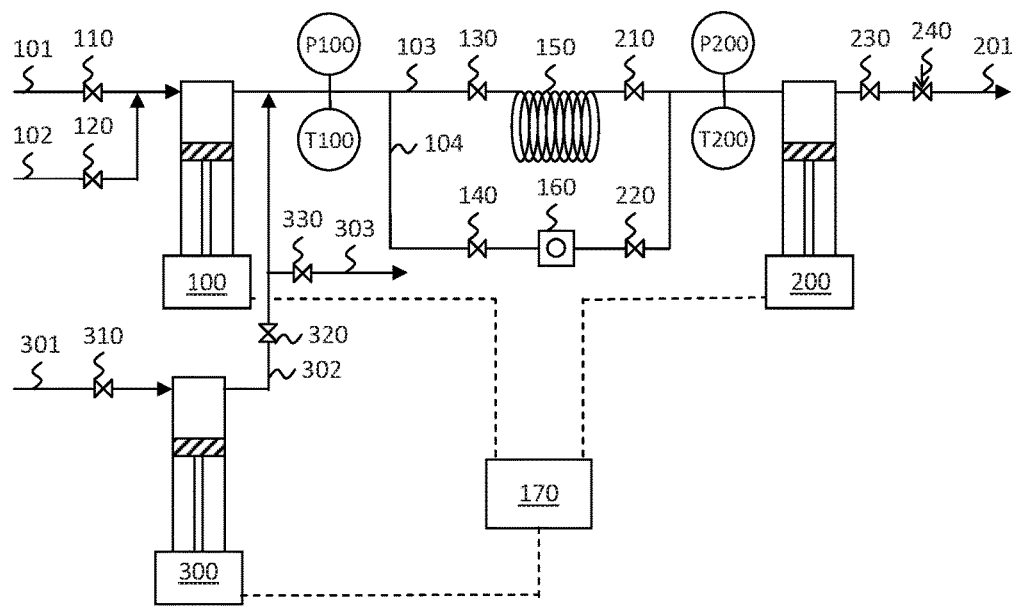
FIG. 2 is a schematic of the experimental apparatus employed to generate the results reported in tables 2, 3 and 4.

The first experimental set-up and procedure is described in more detail with reference to FIG. 2 and Table 2, as follows:

The test apparatus comprised two Teledyne Isco model 500HP syringe pumps, 100 and 200, connected in fluid communication via two alternate paths: (i) a path containing a coiled, six foot length of one-sixteenth inch stainless steel tubing 150, having an inner diameter of 0.0225 inches, and (ii) a path comprising quarter-inch tubing containing a 20 cc view-cell 160. The coiled section was designed to impart significant pressure drop on the flowing fluid, while the view-cell enabled visual inspection of the fluid if desired.

The two pumps were controlled via Teledyne Isco control box 170, and were operated in such a way that fluid could be pumped from one pump to the other through coil 150 or view-cell 160 in one pass, and back again in a second pass, etc. The supplying pump (100 or 200, depending on the phase) was set up to control the fluid flow rate and the receiving pump (200 or 100 depending on the phase) was set up to control the downstream fluid pressure.

Each experimental run was prepared by drawing in a predetermined volume of polymer dissolved in a hydrocarbon co-solvent into pump 100 via line 102. A portion of this liquid was then transferred from pump 100 to pump 200 via line 104 containing view-cell 160, and the balance transferred through line 103 containing coil 150. This ensured that any vapor was swept from these lines.

Once the polymer and co-solvent mixture had been transferred to pump 200, valves 130 and 140 were closed, and pump 200 was used to raise the pressure of the mixture to 3,000 psig. Any remaining vapor was then ejected by opening valve 230 and regulating the flow with needle valve 240, via line 201. Next, a predetermined volume of $LCO_2$ was drawn into pump 100 via line 101. Pump 100 was then used to raise the pressure of the $LCO_2$ to 3,000 psig. Then the pressurized $LCO_2$ in pump 100 and the pressurized polymer and co-solvent mixture in pump 200 were combined by opening valve 140 and passing the contents of pump 200 into pump 100 via line 104, then reversing the flow and passing the contents of pump 100 into pump 200. This process was repeated approximately six times, until a clear mixture was consistently observed via view-cell 160, indicating that the polymer was uniformly dissolved in the mixture, and the mixture was residing in pump 200, ready for testing.

To measure the frictional loss characteristics of the mixtures, fluid was pumped from pump 200 to pump 100 through coil 150 at flow rates progressively increasing over the range 10 to 150 ml/min, with the downstream pressure controlled at 3,000 psig in each instance. At each flow rate, the fluid temperature and pressure was measured at each end of coil 150, using thermocouples T100 and T200 and pressure transducers P100 and P200. The difference in pressure readings across coil 150 was subsequently calculated to give the pressure drop for each fluid flow rate. The mid-point of pressures P100 and P200 and the mid-point of temperatures T100 and T200 were used in calculations to estimate the mean density of the fluid in coil 150 at each flow rate, and then in determining the Fanning friction factor. All of the tests were run at a room temperature of approximately 70° F. and pressures varied from a maximum of approximately 4,000 psig on the upstream side of coil 150, to the controlled value of 3,000 psig, on the downstream side of coil 150. At the end of each of these runs, the mixture was passed back to pump 200 via view cell 160, and the mixture visually checked to ensure that the polymer was completely in solution after each run (appearing as a clear liquid) or if the polymer was not completely in solution after each run (appearing as a cloudy liquid).

After each initial experimental run was completed a predetermined portion of the solution was ejected from the system via line 201, and replaced with fresh $LCO_2$ via pump 100, and then thoroughly mixed according to the same method described above. This gave a new composition enriched in $CO_2$ and depleted in polymer and co-solvent. When fully mixed and flowing through view-cell 160, the mixture was visually checked to see that the polymer was completely in solution.

This entire dilution, mixing, visual checking, and frictional loss characterization process was repeated several times until the frictional loss benefit had been substantially reduced. This was usually the point at which the solution appeared cloudy in view-cell 160, indicating that insufficient co-solvent remained in the mixture to keep the remaining polymer in solution.

Figure 3:
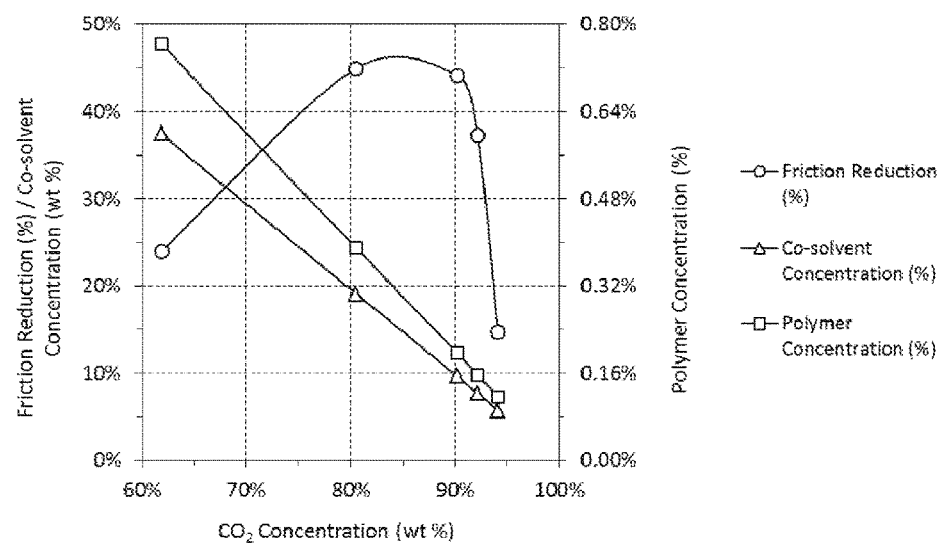
FIG. 3 is a plot of the results obtained from one experiment characterizing friction reduction in solutions comprising polydimethylsiloxane (having a kinematic viscosity greater than 120,000,000 cSt), a naphtha co-solvent and $LCO_2$.

FIG. 3 provides results at a flow rate of 150 ml/min (corresponding to a mean linear velocity in coil 150 of 32 ft/sec) for a single experiment where a 2 wt % solution of a greater than 120,000,000 cSt viscosity polysiloxane sample in a naphtha co-solvent was prepared and progressively reduced in concentration using $LCO_2$, according to the method described above. As shown in FIG. 3, as more $LCO_2$ is added the concentration of polymer and co-solvent naturally decreases. However, the calculated percent friction reduction increases to a maximum of approximately 44% between about 80 wt % and 90 wt % $CO_2$ content and then falls steeply at concentrations higher than about 90 wt % $CO_2$, to about 15% friction reduction at 94 wt % $CO_2$. In commercial field application it is preferred to minimize the amount of polymer and co-solvent added to the $LCO_2$, and maximize the achievable percent friction reduction, therefore a composition of approximately 0.2 wt % of this polymer, 10 wt % of a this co-solvent balance $LCO_2$ would be preferred.

Table 2, below, summarizes the results at the 150 ml/min flow rate (corresponding to a mean linear velocity in coil 150 of 32 ft/sec) for a number of experiments where the polysiloxane polymer, co-solvent and initial concentration of polymer in co-solvent were varied. A plot similar to FIG. 3 exists for each experiment conducted, however for simplicity, the compositions, pressure drops, and percent friction reduction values are given at the single experimental data point closest to 90 wt % $LCO_2$ content.

TABLE 2

Polymer - Hydrocarbon Co-solvent Data

| Experiment number | Polymer used | Co-solvent used | Polymer in co-solvent (wt %) | Fluid composition | | | Pressure drop (psi) | Friction reduction (%) |
| --- | --- | --- | --- | --- | --- | --- | --- | --- |
| | | | | $CO_2$ (wt %) | Polymer (wt %) | Co-solvent (wt %) | | |
| 1 | None | None | 0 | 100.0 | 0.0 | 0.0 | 1,013 | 0 |
| 2 | None | Toluene | 0 | 88.4 | 0.0 | 11.6 | 1,020 | −1 |
| 3 | 2 | Hexane | 5.0 | 90.8 | 0.5 | 8.8 | 770 | 21 |
| 4 | 2 | Toluene | 5.0 | 89.5 | 0.5 | 9.9 | 780 | 23 |
| 5 | 2 | Naphtha 3 | 5.0 | 90.0 | 0.5 | 9.5 | 740 | 23 |
| 6 | 2 | Naphtha 1 | 5.0 | 88.3 | 0.6 | 11.1 | 732 | 23 |

TABLE 2-continued

Polymer - Hydrocarbon Co-solvent Data

| Experiment number | Polymer used | Co-solvent used | Polymer in co-solvent (wt %) | Fluid composition | | | Pressure drop (psi) | Friction reduction (%) |
|---|---|---|---|---|---|---|---|---|
| | | | | CO2 (wt %) | Polymer (wt %) | Co-solvent (wt %) | | |
| 7 | 4 | Toluene | 1.0 | 89.8 | 0.1 | 10.1 | 626 | 38 |
| 8 | 4 | Toluene | 2.0 | 89.0 | 0.2 | 10.7 | 564 | 44 |
| 9 | 4 | Toluene | 5.0 | 90.0 | 0.5 | 9.5 | 579 | 43 |
| 10 | 1 | Toluene | 5.0 | 88.8 | 0.6 | 10.7 | 941 | 7 |
| 11 | 3 | Toluene | 5.0 | 89.7 | 0.5 | 9.8 | 703 | 30 |
| 12 | 4 | Naphtha 3 | 2.0 | 90.2 | 0.2 | 9.6 | 560 | 44 |

Naphtha 1 was sold as "Petroleum Ether", analyzed by gas chromatography to be 96 wt % pentanes and 4 wt % hexanes; Naphtha 3 was sold as "FAM Benzine", analyzed by gas chromatography and determined to be <1 wt % pentanes, 1 wt % cyclopentane, <1 wt % methyl cyclopentane, 39 wt % hexanes, 23 wt % cyclohexane, <1 wt % methyl cyclohexane, 32 wt % heptanes and 5 wt % octanes. Both were supplied by Sigma Aldrich Corporation, St Louis, MO.

As shown, in Table 2, experiments 1 and 2 were baseline experiments carried out with pure $LCO_2$ and pure $LCO_2$ combined with toluene respectively. Similar pressure drops just in excess 1,000 psig were measured, indicating that the addition of the toluene co-solvent on its own did not measurably affect frictional pressure loss.

From the data collected in experiments 3, 4, 5 and 6 as well as in 8 and 12 it can be seen that similar pressure drops and percent friction reduction values are obtained with four different co-solvents (hexane, toluene, naphtha 1 and naphtha 3), indicating that these co-solvents can be used somewhat interchangeably. From experiments 7, 8 and 9, it can be seen that for the greater than 120,000,000 cSt polysiloxane in toluene, the optimum initial concentration of the polymer in the toluene co-solvent is approximately 2%, yielding 44% friction reduction. Additionally, it can be concluded from experiments 10, 4, 11, and 9 that the percent friction reduction achieved increases with polymer molecular weight and kinematic viscosity, the highest weight average molecular weight and kinematic viscosity being preferred. There is no direct comparison to be made between, polysiloxanes 1 and 2 having trimethylsiloxy terminations, or polysiloxane 3 having a hydroxy termination, or polsiloxane 4 having a vinyl termination in order to make any conclusions about whether one termination group is preferred over the other, however it can be seen that significant friction reduction is achieved with all three.

Example 2

In subsequent experiments a set-up was used to test how polymer and co-solvent could be conveniently added to the $LCO_2$ fracturing fluid in a commercial fracturing operation.

The experimental set-up and procedure is described in more detail with reference to FIG. 2, as follows:

In this experiment, the polymer and co-solvent mixture was directly injected into flowing $LCO_2$ immediately prior to the section of coiled tube 150, and the resultant pressure drops measured as a function of the combined flow rate.

To add the polymer and co-solvent mixture, a third Teledyne Isco syringe pump—model 100D, 300, was employed. To prepare each run, polymer and co-solvent mixture was drawn into pump 300 through line 301, and vapor was ejected from the pump 300 and line 302 by flowing a small amount of polymer and co-solvent mixture from pump 300 through line 330, in a priming step. After vapor had been removed, the polymer and co-solvent mixture was raised in pressure to 3,000 psig. Next, $LCO_2$ was drawn into pump 100 via line 101, raised in pressure to 3,000 psig and a portion flowed through coil 150 and then view cell 160, through pump 200—in its empty position, and out of the system, via line 201. Needle valve 240 in line 201 was used to maintain system pressure while flowing the $LCO_2$. This step ensured that any vapor was purged from the system. Frictional pressure loss characteristics were determined for various compositions by controlling the flow rate of $LCO_2$ with pump 100, controlling the flow rate of polymer and co-solvent mixture with pump 300, and controlling the downstream pressure with pump 200.

TABLE 3

Polymer - Co-solvent Data, with Direct Injection

| Experiment number | Polymer used | Co-solvent used | Polymer in co-solvent (wt %) | Fluid composition | | | Pressure drop (psi) | Friction reduction (%) |
|---|---|---|---|---|---|---|---|---|
| | | | | CO2 (wt %) | Polymer (wt %) | Co-solvent (wt %) | | |
| 13 | 4 | Naphtha 3 | 2.0 | 89.2 | 0.2 | 10.6 | 555 | 46 |
| 14 | 4 | Silicone oil 3 | 2.0 | 89.8 | 0.2 | 10.0 | 658 | 35 |
| 15 | 2 | Silicone oil 3 | 5.0 | 89.8 | 0.5 | 9.7 | 905 | 11 |
| 16 | 2 | Silicone oil 1 | 5.0 | 90.2 | 0.5 | 9.3 | 878 | 15 |
| 17 | 2 | Silicone oil 2 | 5.0 | 90.0 | 0.5 | 9.5 | 905 | 13 |

Silicone oil 1 was 5 cSt oil, Silicone oil 2 was Decamethylcyclopentasiloxane oil, both supplied by Sigma Aldrich Corp., St. Louis, MO. Silicone oil 3 was a 0.65 cSt silicone oil supplied by Gelest Inc., Morrisville, PA.

With reference to Table 3, above, in experiment 13 a 2.0 wt % solution of greater than 120,000,000 cSt polysiloxane in Naphtha 3 was directly injected into pure $LCO_2$ to create a mixture comprising 89.2% $CO_2$, 0.2 wt % polymer and 10.6 wt % co-solvent, flowing at 150 ml/min through coil 150. The pressure drop measured was 555 psig yielding friction reduction of 46%. This was very similar result to experiment 12, detailed in Table 1, where a similar composition was arrived at by progressive dilution and mixing of $LCO_2$ with polymer and co-solvent, and demonstrates that the polymer—co-solvent—$LCO_2$ mixture may conveniently be made by directly injecting the polymer—co-solvent mixture into the flowing $LCO_2$ stream, rendering the polymer quickly disposed to reduce frictional pressure losses in the resulting mixture.

Referring back to Table 3, in experiment 14 a 2.0 wt % solution of great than 120,000,000 cSt polysiloxane in Silicone oil 3 was directly injected into flowing $LCO_2$ to create a mixture comprising 89.8% $CO_2$, 0.2 wt % polymer and 10.0 wt % co-solvent, flowing at 150 ml/min through coil 150. The pressure drop measured was 658 psig yielding friction reduction of 35%. Lower friction reduction was obtained than in experiment 13, which is attributable to the use of silicone oil 3 as the co-solvent over Naptha 3. In experiments 15, 16 and 17, a 597,000 g/mol, 20,000,000 cSt PDMS polymer was dissolved at 5.0 wt % in each of three different silicone oils and directly injected into pure $LCO_2$ to create a mixtures comprising approximately 90% $CO_2$, 0.2 wt % polymer and 9.8 wt % co-solvent, flowing at 150 ml/min through coil 150. Friction reduction values in the range 11% to 15% were achieved, which again lower than those obtained in experiments 3, 4, 5 and 6 using hydrocarbon co-solvents. Despite lower friction reduction though, these experiments showed that light silicone oils could be used as co-solvents for the PDMS polymer.

Experiment 18 conveniently demonstrated that that a significant portion of the naphtha co-solvent can be mixed with the $LCO_2$ rather than the with PDMS polymer, whilst still achieving significant friction reduction of 42%. This is four percentage points less than that in experiment 13 due to half the concentration of polymer being used (0.1 wt % vs 0.2 wt %). The advantage in adding a portion of the co-solvent to the $LCO_2$ is that a more concentrated polymer friction reducer solution can be made up, reducing the volume of this flammable mixture that needs to be stored and pumped. In commercial application, the balance of the flammable naphtha co-solvent, in this case, may be conveniently combined with the $LCO_2$ in the $LCO_2$ storage tanks to reduce the risk associated with storage and pumping this flammable co-solvent.

In experiment 19 methyl oleate was used as the second co-solvent to achieve 40% friction reduction and in experiment 20, a soy oil biodiesel was used to achieve 37% friction reduction. Both of these compounds are types or mixtures of fatty esters, having a relatively high boiling point (424° F. and 401° F. respectively compared to 149° F. for the naphtha 3), high flash point (235° F. and 320° F. respectively compared to −15° F. for the naphtha 3), and relatively low cost. The advantage of using them as a second co-solvent is in reducing the total amount of the first more flammable co-solvent used while incurring minimal effect on friction

TABLE 4

Polymer - Two Co-solvent Data, with Direct Injection

| Experiment number | Polymer used | Polymer in 1st co-solvent (wt %) | 2nd co-solvent in $CO_2$ (wt %) | Fluid composition | | | | Pressure drop (psi) | Friction reduction (%) |
|---|---|---|---|---|---|---|---|---|---|
| | | | | CO2 (wt %) | Polymer (wt %) | 1st co-solvent (wt %) | 2nd co-solvent (wt %) | | |
| 18 | 4 | 10 wt % in Naphtha 3 | 9 wt % Naphtha 3 in $CO_2$ | 90.0 | 0.1 | 0.9 | 9.0 | 584 | 42 |
| 19 | 4 | 10 wt % in Naphtha 3 | 9 wt % Methyl Oleate in CO2 | 90.0 | 0.1 | 0.9 | 9.0 | 612 | 40 |
| 20 | 4 | 10 wt % in Naphtha 3 | 9 wt % Soy Oil Biodiesel in $CO_2$ | 90.0 | 0.1 | 0.9 | 9.0 | 641 | 37 |
| 21 | 4 | 10 wt % in Naphtha 3 | 9 wt % DGBEA in $CO_2$ | 90.0 | 0.1 | 0.9 | 9.0 | 673 | 34 |
| 22 | 4 | 10 wt % in Naphtha 3 | 9 wt % TetraGDE in $CO_2$ | 90.0 | 0.1 | 0.9 | 9.0 | 644 | 36 |
| 23 | 4 | 10 wt % in Naphtha 3 | 9 wt % TriGDE in $CO_2$ | 90.0 | 0.1 | 0.9 | 9.0 | 698 | 31 |

Methyl Oleate was 70% pure, DGBEA was Diethylene Glycol Butyl Ether Acetate, TetraGDE was Tetraethylene Glycol Dimethyl Ether, and TriGDE was Triethylene Glycol Dimethyl Ether, all supplied by Sigma Aldrich Corp., St Louis MO. The Soy Oil Biodiesel was supplied by Fisher Scientific, Pittsburgh, PA.

With reference to Table 4, above, experiments 18 through 23 were carried out in similar fashion to experiments 13 through 17, but utilizing two different co-solvents in the procedure instead of one. Each experiment utilized a more concentrated 10 wt % solution of the greater than 120,000,000 cSt PDMS polymer in Naphtha 3 to be introduced via pump 300. A 10 wt % of this polymer was used as a 20 wt % solution was found to be too viscous to be drawn into the system for testing. A 20 wt % solution was desired in order to provide 0.2 wt % polymer in the final composition, however experiments were limited to a 10 wt % solution, which ultimately yielded a 0.1 wt % in the final composition. Each experiment also pre-mixed a second co-solvent with the $LCO_2$ at 9.0 wt %. When combined, the resultant mixtures comprised 90 wt % $CO_2$, 0.1 wt % of the polymer, 0.9 wt % Naphtha co-solvent and 9 wt % of the second co-solvent. The second solvents tested are listed in table 4, in addition to control experiment 18, where the second co-solvent was the same as the first co-solvent: naphtha 3.

reduction. Again, in commercial application, the second co-solvent may be conveniently combined with the $LCO_2$ in the $LCO_2$ storage tanks or added to the $LCO_2$ stream at any convenient point. Experiments 21, 22 and 23 utilized three other second co-solvents with lower flammability (all boiling points greater than 400° F. and all flash points greater than 200° F.), to achieve substantial friction reduction.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims. Although various embodiments have been shown and described, the present disclosure is not so limited and will be understood to include all such modifications and variations as would be apparent to one skilled in the art.

We claim:

1. A system for fracturing a well utilizing a fracturing fluid composition, comprising:
   (a) providing at least one storage tank holding the liquid carbon dioxide at a pressure range of about 150 to 400 psig and a temperature of about −40 to +20° F.;
   (b) providing at least one fracturing pump in fluid communication with the at least one storage tank disposed downstream thereof, wherein the fracturing pump raises the pressure of the liquid carbon dioxide to a pressure in the range of 2,000 to 10,000 psig;
   (c) connecting the at least one fracturing pump to a well head in order to fluidly transmit the fracturing fluid composition downstream to the well head during a fracturing operation; and
   (d) providing an injection point downstream of the at least one fracturing pump for injecting at least one friction reducing polymer having a kinematic viscosity greater than 10,000,000 cSt dissolved in at least one co-solvent to attain a fracturing fluid composition containing at least 80 wt % carbon dioxide, 0.001-1.0 wt % of said friction reducing polymer and 1-19 wt % of the at least one co-solvent.

2. The system of claim 1, further comprising an injection point disposed upstream of the injection point in (d) for injecting a second co-solvent having a closed cup flash point greater than 140° F., where the first at least one co-solvent is partially substituted with the second co-solvent, and where the total amount of co-solvent in the fracturing fluid composition remains in the range of 1-19 wt %.

3. The system of claim 1, wherein the friction reducing polymer is a polydimethylsiloxane having hydroxyl, trimethylsiloxy, or vinyl terminal groups.

4. The system of claim 1, further comprising at least one booster pump disposed between the at least one storage tank and the at least one fracturing pump to increase the liquid carbon dioxide pressure by at about 50 psi or more.

5. The system of claim 1, further comprising an injection point upstream of the at least one fracturing pump for the addition of proppant.

6. A system for utilizing a fracturing fluid composition in an operation, comprising:
   (a) providing at least one storage tank holding the liquid carbon dioxide at a pressure range of about 150 to 400 psig and a temperature of −40 to +20° F.;
   (b) providing at least one fracturing pump in fluid communication with the at least one storage tank disposed downstream thereof, wherein the fracturing pump raises the pressure of the liquid carbon dioxide to a pressure in the range of 2,000 to 10,000 psig;
   (c) connecting the at least one fracturing pump to a well head in order to fluidly transmit the fracturing fluid composition downstream to the well head during a fracturing operation; and
   (d) providing an injection point upstream of the at least one fracturing pump for injecting at least one friction reducing polymer having a kinematic viscosity greater than 10,000,000 cSt dissolved in at least one co-solvent to attain a fracturing fluid composition containing at least 80 wt % carbon dioxide, 0.001-1.0 wt % dissolved of said friction reducing polymer and 1-19 wt % of the at least one co-solvent.

7. The system of claim 6, further comprising an injection point disposed upstream of the injection point in (d) for injecting a second co-solvent having a closed cup flash point greater than 140° F., where the first at least one co-solvent is partially substituted with the second co-solvent, and where the total amount of co-solvent in the fracturing fluid composition remains in the range of 1-19 wt %.

* * * * *